United States Patent [19]

Allison

[11] 4,065,225

[45] Dec. 27, 1977

[54] MULTIVANE WINDMILL

[76] Inventor: William D. Allison, 39 Radnor Circle, Grosse Pointe Farms, Mich. 48236

[21] Appl. No.: 679,157

[22] Filed: Apr. 22, 1976

[51] Int. Cl.² ............................ F03D 1/02; F03D 7/04
[52] U.S. Cl. ...................................... 416/121; 416/11; 416/89; 416/200 A
[58] Field of Search ..................... 416/200, 200 A, 11, 416/89, 121, 206, 210

[56]  References Cited

U.S. PATENT DOCUMENTS

| 244,971 | 8/1881 | Adams | 416/210 |
|---|---|---|---|
| 441,519 | 11/1890 | Wallace | 416/200 |
| 1,073,413 | 9/1913 | Faehrmann | 416/200 |
| 1,142,502 | 6/1915 | Donnelly | 416/9 |
| 1,498,978 | 6/1924 | Muntz | 416/DIG. 4 |
| 1,516,472 | 11/1924 | Beaty | 416/132 B |
| 1,686,214 | 10/1928 | Kyle | 416/210 |
| 1,707,235 | 4/1929 | Sargent | 416/11 |
| 1,982,039 | 11/1934 | Youngberg | 416/89 |
| 1,986,752 | 1/1935 | Rorvik | 416/89 |
| 2,096,860 | 10/1937 | Renquist et al. | 416/89 |
| 3,032,119 | 5/1962 | Hachmann | 416/200 |
| 3,942,026 | 3/1976 | Carter | 46/41 X |

FOREIGN PATENT DOCUMENTS

| 162,478 | 8/1948 | Austria | 416/121 |
|---|---|---|---|
| 500,792 | 2/1951 | Belgium | 416/11 |
| 560,874 | 7/1958 | Canada | 416/121 |
| 922,918 | 6/1947 | France | 416/89 |
| 982,600 | 6/1951 | France | 416/121 |
| 988,883 | 9/1951 | France | 416/11 |
| 411,225 | 6/1910 | France | 416/210 |

Primary Examiner—Everette A. Powell, Jr.

[57] ABSTRACT

A windmill having a plurality of pairs of diametrically opposed vanes mounted for rotation about a horizontal axis in alignment with the wind. The pairs of vanes are supported in uniformly spaced relationship to each other axially of the axis of rotation and each successive pair is indexed circumferentialy in the direction of rotation relative to the prior pair. The vanes are automatically moved to a less efficient position as the speed of the wind increases to limit the maximum speed of the windmill.

6 Claims, 7 Drawing Figures

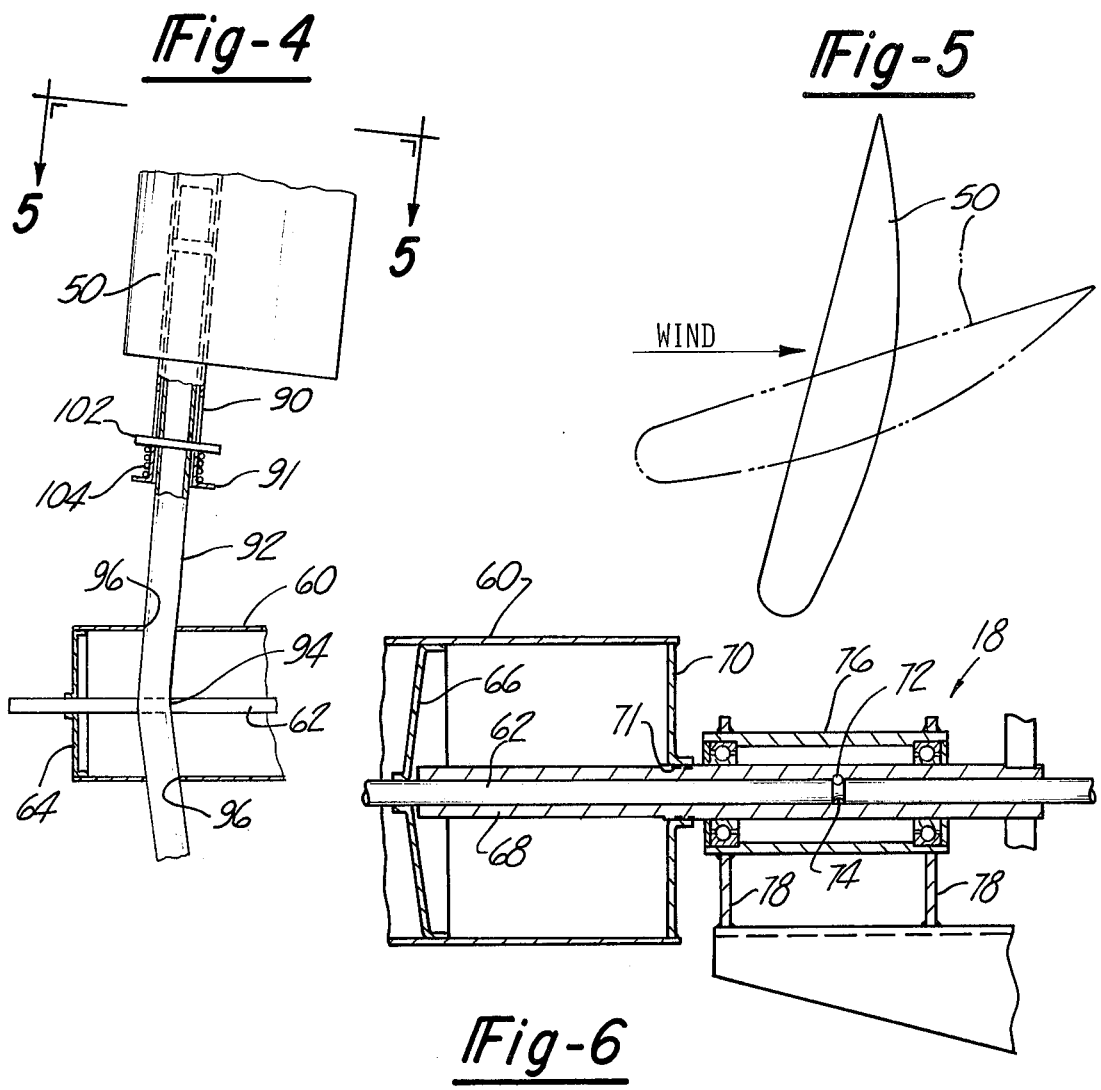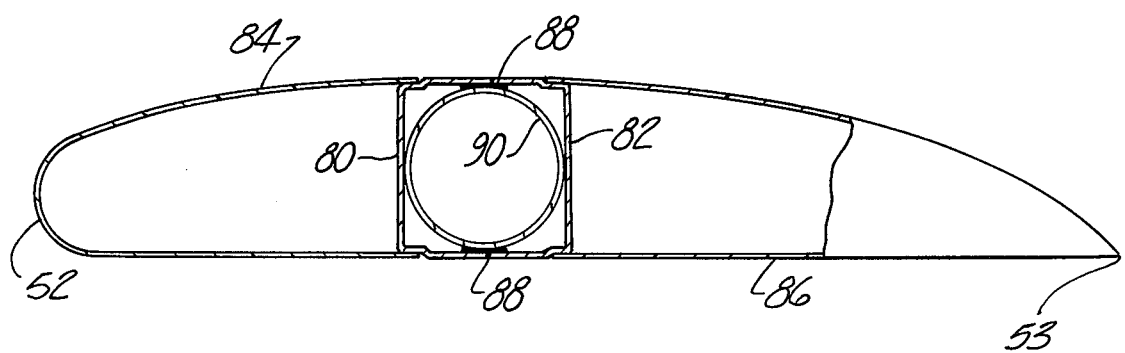

MULTIVANE WINDMILL

This invention relates to windmills and more particularly to windmills which rotate about a horizontal axis in alignment with the wind.

Windmills having multiple vanes have been produced in the past but the vanes of such windmills have been located in a single plane of rotation. Such a mounting creates structural problems in forming a hub of sufficient strength to support multiple vanes or to provide for pitch change on feathering of the vanes by conventional means.

It is an object of the invention to provide a windmill having a plurality of vanes so arranged that the maximum utility is made of the available wind.

Another object of the invention is to provide a windmill in which the vanes and rotor may be of simple construction and weight and yet may be made of any desired size.

Another object of the invention is to provide a windmill in which pairs of rotors are spaced apart axially of the axis of rotation and in which the pairs of rotors are indexed circumferentially so that succeeding pairs of rotors present unobstructed surfaces to the wind.

A windmill has been provided in which a plurality of pairs of rotors are uniformly spaced along the axis of rotation and in which the succeeding pairs of rotors are indexed relative to each other in a circumferential direction to take full advantage of the force of the wind. The vanes employed in the rotor have a high aspect ratio for efficiently employing the wind force and the tips of the vanes are so arranged that they form a helix. Each of the vanes is supported at a downwind angle to minimize the effects of centrifugal force and thrust. Also the vanes are supported in a manner which changes their pitch so that as the speed of the wind and therefore the rotational speed of the rotor increases, the vanes change their pitch to reduce rotational velocity of the rotor relative to wind velocity.

FIG. 4 is a view similar to FIG. 3 but showing another operating position of the parts;

FIG. 5 is a sectional view taken on line 5—5 in FIG. 4;

FIG. 6 is a sectional view at an enlarged scale of the bearing structure employed in the windmill; and FIG. 7 is a cross-sectional view at an enlarged scale taken generally on line 7—7 in FIG. 3 showing a construction showing one of the rotors.

Figure 1:
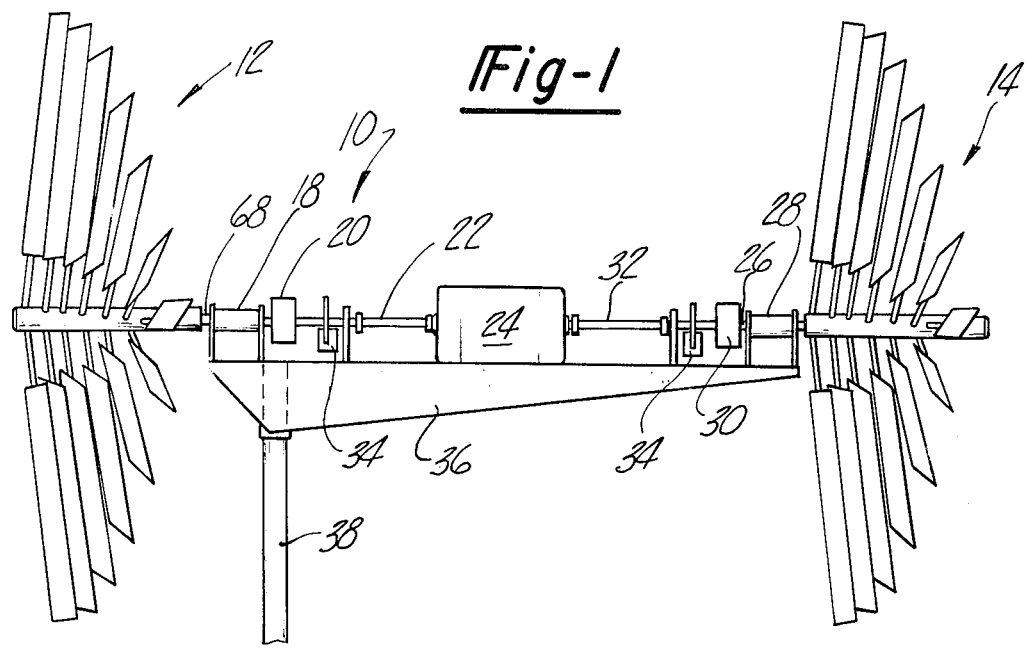
FIG. 1 is a side view of the windmill embodying the invention.

Referring to the drawings the windmill embodying the invention is designated generally at 10 and includes a primary rotor 12 and a secondary rotor 14 mounted for rotation about a horizontal axis.

The primary rotor 12 includes a shaft rotatably supported in a bearing assembly 18. The shaft is connected through a gear box 20 to a shaft 22 of a generator 24. The gear box 20 is for the purpose of multiplying the speed of rotation of the rotor 12 to increase the speed of rotation of the generator 24.

The secondary rotor 14 is mounted in the same manner as the primary rotor in that its shaft 26 is supported in a bearing assembly 28 and the shaft 26 is connected through a gear box 30 to a shaft 32 connected to the generator 24.

A pair of disc brakes 34 are associated with the rotors 12 and 14, respectively, so that rotation of either of the rotors may be stopped for the purpose of assembly and servicing.

The bearings 18 and 28 as well as the generator 24 are mounted on a platform 36 which is supported for rotation about a vertical axis formed by the post 38. The post 38 is located closer to the rotor 12 than to the rotor 14 so that the rotor 14 will serve to weathercock the windmill rotors into alignment with the wind.

The rotor 12 is made up of a plurality of vane assemblies, seven of which are shown in the drawings by way of example and which are identified as 41 through 47. Each vane assembly includes a pair of diametrically opposed vanes 50 and 51. The vane assemblies 41 through 47 are uniformly spaced axially of the rotor 12. Preferably the axial spacing is selected at a distance equal to at least one half of the width of the vanes 50 and 51. Also, each vane assembly is indexed a predetermined amount circumferentially in a clockwise direction as viewed in FIG. 2 from the preceding adjacent vane assembly. The preferred amount of circumferential indexing has been found to be 12 to 15 degrees and in the drawings 15 degrees of indexing is illustrated for seven pairs of vanes. Also, it will be noted from an inspection of FIG. 2 that the vanes 50 occupy an arc of approximately 100° and that the vanes 51 occupy another equal arc of 100° so that the vane area exposed to the wind is approximately 200° of arc. If desired additional pairs of vanes can be added. For example, 12 pairs of axially spaced rotors having 15° circumferential indexing might be used so that the vanes occupy a full 360°. However, it has been found that in such arrangements the last pairs of vanes are not as effective as the forward vanes.

As a result of the circumferential indexing of the vane assemblies, the tips of the vanes describe a helical path progressing rearwardly and in a clockwise direction.

Figure 2:
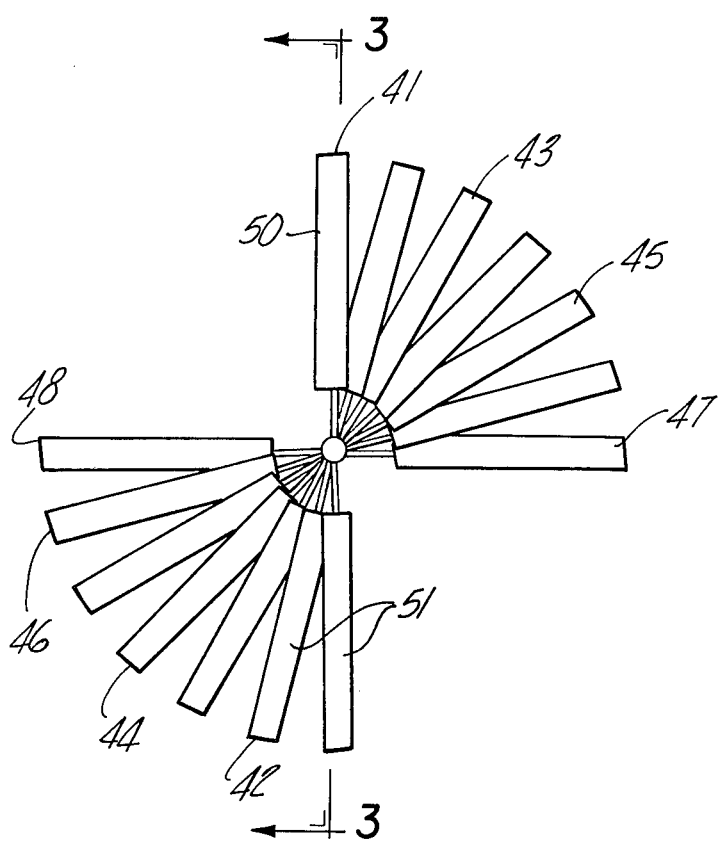
FIG. 2 is a front view of the windmill seen in FIG. 1.

The pitch of the vanes 50 and 51 is such that a wind force acting axially of the rotor tends to turn the rotor in a clockwise direction as viewed in FIG. 2. Stated otherwise the leading edges 52 are spaced forwardly and in the direction of rotation relative to the trailing edges 53 of the vanes. This angular displacement of the vanes is commonly referred to as pitch which in the subsequent discussion will be considered to be the angle of the forward flat surfaces of the vanes relative to a plane normal to the axis of rotation of the rotor. By way of example, in one form of the invention the vanes 50 and 51 were made with a pitch of 12 degrees.

Figure 3:
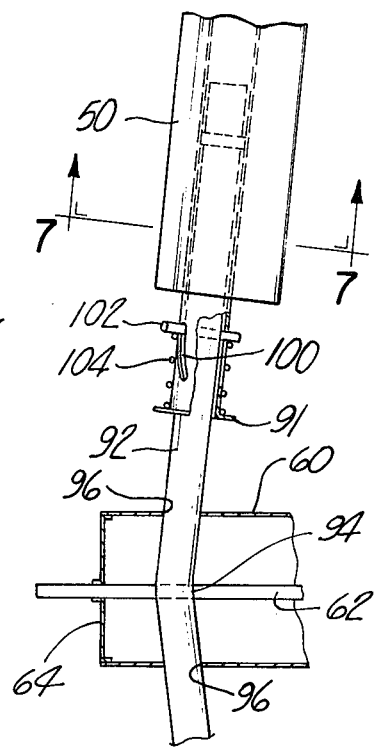
FIG. 3 is a sectional view at an enlarged scale of a portion of the windmill taken on line 3—3 in FIG. 2.

The vane assemblies 41 through 47 are mounted relative to a shaft assembly which includes a tubular housing or torque member 60 and a central shaft 62 passing within and coaxially aligned with the axis of the tube 60. The forward end of the tube 60 is provided with a wall member 64 which receives the shaft 62 and positions it in axial alignment with the tube 60 as best seen in FIG. 3. Referring to FIG. 6 an interior wall 66 is formed adjacent the rearward end of the tube 60 so that the walls 64 and 66 act to position the shaft 62 in axial alignment with the tube 60. The rearward end of the shaft 62 receives a tubular drive member 68 which is rotatably journaled in the bearing assembly 18. The tube 68 is supported by a rear wall 70 which is formed rigidly with the tubular member 60 and is disposed closely adjacent to the bearing assembly 18. Rear wall 70 and tube 68 are fitted with complementary serrations 71 or other key device to transfer rotational torque from tube 60 to tube 68. The shaft 62 is connected to the tubular drive member 68 and is held against axial displacement by means of a pin 72 (FIG. 6) which passes transversely of the tube 68 and in radially spaced relationship to the axis of rotation of the shaft 62. The pin 72, which may be in a form of a bolt or the like, passes through an annular groove 74 formed in the shaft 62. The pin 72 and groove 74 prevent relative axial displacement between the shaft 62 and tubular drive shaft 68.

The tubular drive shaft 68 is journaled for rotation in the bearing assembly 18 which includes a tubular housing member 76 supported by brackets 78 from the platform 36. The tubular drive member 68 is adapted for connection to the gear drive 20 and ultimately to the generator 24 for rotating the latter.

The vane assemblies 41 through 47 are identical to each other and reference will be made to the forward or leading vane assembly 41. Each of the vane assemblies includes a pair of blades or vanes 50 and 51 which are identical to each other. As best seen in FIG. 7 the vanes 50 and 51 each include a pair of channel members 80 and 82. The channel member 80 has attached thereto a blade tip portion 84 which may be fabricated of sheet materials to form the generally elliptical leading edge portion 52. Similarly the channel 82 is provided with a sheet portion 86 which forms the relatively sharp trailing edge 53. In actual construction it is possible to make the portions 84 and 86 of aluminum or steel and to weld their edges to the channel members 80 and 82, respectively. The channel members 80 and 82 also are welded together at 88 to form a housing portion receiving the tubular socket member 90. The channel members 80 and 82 are welded directly to one end of the tubular member 90 and the other end protrudes from the radial inner end of the vanes and has a flanged portion 91 at its free end as seen in FIGS. 3 and 4.

The vanes are generally rectangular and have a relatively high aspect ratio which is the ratio of the vane length to its cord or width. As aspect ratio of six, that is the length being six times the width of the vanes is contemplated as being desirable.

The tubular member 90 of each of the vanes 50 and 51 acts to slidably receive opposite ends of a vane support member 92 which also may be of tubular construction and is bent at its midpoint as indicated at 94 in FIGS. 3 and 4. The tubular support member 92 projects equal distances from the axis of the torque tube 60 and through pairs of diametrically opposed openings 96. The pairs of openings 96 corresponding in number to the number of vane assemblies, are uniformly spaced axially of the tube 60 and are indexed circumferentially equal amounts to insure that the support members 92 for the vane assemblies 41 through 47 are accurately held in position by the shaft 62 which passes through a transverse opening located at the point 94. In this manner the shaft 62 locks the support member 92 in position and the force of the rotating vane is transmitted through the torque tube 60 to the bearing tube 68 which in turn is connected to the generator shaft 22. Also the spaced wall 66 and 70 at the driving end of the torque tube 60 obsorbs bending loads of the rotor and the rear wall 70 transmits torque through serrations 71 to the tube 68 which forms the driving member connected to the gear boxes. The shaft 62 acts to hold the vane support members in position and does not transmit any torque.

Opposite ends of each support member 92 are slidably received in the socket members 90 of a pair of vanes 50 and 51, respectively. As seen in FIG. 3, the portion of tube 90 projecting from the inner end of the blades 50 and 51 is provided with a slot 100 which receives a pin 102. The pin 102 passes through the tubular support member 92 and is slidably received in the groove 100. A compression spring 104 is coiled around the tube 90 so that one end of the spring 104 is seated against the pin 102 and the opposite end is seated against the flange 91 formed at the end of the tube 90. The spring 104 serves to bias the vanes 50 and 51 radially inwardly toward the torque tube 60. Upon rotation of the rotor 12, centrifugal force urges the blades radially outwardly and in so doing the springs 104 are compressed permitting the vanes 50 and 51 to move radially outwardly. As the vanes move outwardly, the pins 102 slide in the slots 100 causing the tube 90 to rotate relative to the support shaft 92 and the pitch of the vanes changes from the broken line to full line position in FIG. 5.

Referring again to FIGS. 3 and 4 it will be noted that the support member 92 is bent at 94 so that the vanes 50 and 51 of each of the vane assemblies 41 through 48 is angled or is tilted rearwardly or downwind a slight amount. In actual practice a tilt of approximately 7° to the axis of rotation is employed for the purpose of locating the vane and its support member generally along the resultant line of the centrifugal force and axial thrust of the rotor.

As pointed out earlier, the blades 50 and 51 have an initial pitch of approximately 12° when the rotor is at rest or rotating at low speeds. However, as speeds of the rotor increase the blades move outwardly tending to change the pitch so that at maximum speed of the rotor the blades have their surfaces move nearly parallel to the plane passing through the axis of rotation. In other words, the pitch has been increased from 12° toward 90°. Increasing the pitch in proportion to the speed of rotation serves to limit the maximum rotational speed of the windmill which protects the windmill from damage in the forces which would otherwise be imposed during high winds.

The construction of the secondary rotor 14 is essentially the same as the construction of the primary rotor. Also, the forward or left end of the torque tube 60 for the rear rotor 14 seen in FIG. 1 is generally the same as the rear or right end of the torque tube 60 for the primary rotor 12, the details of which can be seen in FIG. 6.

As viewed from the front of the rotor 12, the rotor 14 is designed to turn in the same direction as the rotor 12, that is in a clockwise direction as viewed in FIG. 2. If desired the pitch of the blades 50 and 51 of the vane assemblies may be increased over the pitch of the blades of the forward rotor. This is done for the reason that the speed of the wind in the area of the secondary rotor 14 will be diminished due to the interruption of the wind by the primary rotor 12.

Also it has been found that the speed of the wind or its effectiveness on the blades changes from the lead vane assembly 41 to the trailing vane assemblies 48 so that in certain large installations it is desirable to progressively increase the pitch of each succeeding vane assembly to take advantage of the wind force.

It will be understood that the secondary rotor could be omitted and a conventional weathercocking vane substituted to insure alignment of the rotational axis of the primary rotor 12 with the direction of the wind.

The advantages of the present invention can be accomplished by a windmill having seven pairs of vanes although a greater or lesser number of pairs may be used. Also it is desirable that the vanes have an aspect ratio of approximately six, that is, that their length be six times their width. Preferably the pairs of vanes should be spaced axially a distance equal to at least one half the vane width and the vanes should be indexed circumferentially about 15° from each other independently of the number of pairs which are used. Also the vanes should have an initial low speed pitch of twelve to fifteen degrees. A windmill constructed in these proportions will perform satisfactorily in sizes ranging from very small to very large. Moreover, such an arrangement operates far more efficiently than one in which all the vanes are equally spaced through a full 360° for rotation in a common plane. Also it has been found that vanes of high aspect ratio are far more efficient than wide vanes with low aspect ratio. As a result, multiple vanes of high aspect ratio as employed in the present embodiment of the invention are vastly superior in power output than rotors with only a pair of vanes even though the areas of the vanes of both types of rotors are the same.

In operation, the wind, which is assumed to be blowing horizontally over the surface on which the windmill is located, tends to rotate the platform 40 about the vertical post 42 because of the secondary rotor assembly 14. With the axis pointing in the direction of the wind, the force of the wind is effective on the blades 50 and 51 to cause rotation of the rotor assemblies 12 and 14 in a clockwise direction as viewed from the front, that is, from the left end of the windmill 10 as seen in FIG. 1. Rotation of the rotors 12 and 14 is transmitted through the gear arrangements 20 and 30 and through the shafts 22 and 32 to the generator 24 for generating electricity. Other mechanisms requiring rotary motion could be substituted for the generator 24. During rotation of the rotors 12 and 14, changes in wind direction cause the rotors to change position to realign with the direction of the wind due to the unbalanced position of the rotor 14 relative to the vertical axis afforded for the platform 40 by the post 42.

As the speed of the wind increases, the rotational speed of the rotors 12 and 14 will increase. As rotational speed increases, the pitch of the vanes 50 will increase from an initial minimum to a maximum. For very high winds it is desirable to maintain rotation of the rotor to generate electricity but to limit the maximum speed of the rotor so that extreme centrifugal forces are not imposed which could cause damage to various of the parts. By so limiting speed and therefore excessive forces it is possible to use economical construction for the vanes and other components of the windmill.

It will be noted that the rotor is of simple construction and employs a torque tube 60 by which vane movement can be effectively transmitted to the drive shaft without the necessity of providing a hub of heavy construction and expensive machining. Moreover, the hub construction effectively absorbs bending loads with a simple construction making it possible to use large rotors.

A multivane windmill has been provided in which pairs of vanes are spaced axially of the axis of rotation with succeeding pairs of vanes indexed circumferentially from each other so that the vanes form a generally helical pattern progressing from a forward to a rearward end of the rotor. The arrangement is such that succeeding pairs of vanes are disposed for more efficient and effective rotational operation in their individual planes. Moreover the pairs of vanes change their pitch or are feathered automatically in response to increased winds and therefore increased rotation so that the maximum speed is limited to prevent damage to the components of the windmill. The entire arrangement is such that by limiting the speed of rotation and by more efficiently employing the vanes, it is possible to use a very economical construction and at the same time achieve high operational efficiency.

The embodiments of the invention in which an exclusive property or privilege is claimed are defined as follows:

1. A windmill comprising; a rotor rotatable on a horizontal axis extending in the direction of the wind, said rotor comprising a plurality of pairs of diametrically opposed vanes, said vanes being pitched equally and in the same direction to cause rotation of the rotor in one direction, each pair of vanes progressing rearwardly away from the forward end of the axis being offset circumferentially relative to the preceding pair of vanes and in the direction of rotation of the rotor, said rotor including a hub assembly including an axially extending torque member, a support member for each pair of vanes extending radially and in opposite directions from said torque member, and a shaft passing through all of said support members and retaining said support members fixed relative to said torque member.

2. The combination of claim 1 in which said hub includes an elongated tubular drive member extending longitudinally from and concentrically with said hub, said shaft extending through said drive member and said support members.

3. The combination of claim 2 wherein the tubular drive member is nonrotatably connected to said torque member.

4. The combination of claim 3 and further comprising bearing means supporting a portion of said drive member at one end of said rotor.

5. The combination of claim 2 and further comprising a torque member having axially spaced walls, said walls maintaining said shaft axially aligned with said torque member, and an additional wall spaced from one of said walls, a tubular drive member supported in said additional wall and on said shaft for nonrotatable connection with said torque member.

6. The combination of claim 2 and further comprising means maintaining said drive member and shaft axially fixed relative to each other.

* * * * *

UNITED STATES PATENT OFFICE
CERTIFICATE OF CORRECTION

Patent No. 4,065,225      Dated December 27, 1977

Inventor(s) William D. Allison

It is certified that error appears in the above-identified patent and that said Letters Patent are hereby corrected as shown below:

Under References cited

"3,942,026  3/1976  Carter  46/41X" should read

--3,942,026  3/1976  Carter  416/41X--

In the Abstract, line 6, "circumferentialy" should read

--circumferentially--

Signed and Sealed this

Sixth Day of June 1978

[SEAL]

Attest:

RUTH C. MASON
*Attesting Officer*

DONALD W. BANNER
*Commissioner of Patents and Trademarks*